(12) United States Patent
Song et al.

(10) Patent No.: US 6,503,663 B1
(45) Date of Patent: Jan. 7, 2003

(54) ORGANIC ELECTROLYTE AND LITHIUM SECONDARY BATTERY

(75) Inventors: Eui-hwan Song, Cheonan (KR); Won-il Jung, Cheonan (KR); Duck-chul Hwang, Cheonan (KR)

(73) Assignee: Samsung SDI Co., Ltd., Kyungki-do (KR)

( * ) Notice: Subject to any disclaimer, the term of this patent is extended or adjusted under 35 U.S.C. 154(b) by 0 days.

(21) Appl. No.: 09/565,069

(22) Filed: May 5, 2000

(51) Int. Cl.$^7$ .............................................. H01M 6/16
(52) U.S. Cl. ........................ 429/331; 429/332; 429/330; 429/322; 429/323; 429/231.1; 429/231.8; 429/231.95
(58) Field of Search ................................ 429/330, 332, 429/322, 231.1, 231.8, 231.95, 331, 323

(56) References Cited

U.S. PATENT DOCUMENTS

| | | | |
|---|---|---|---|
| 5,437,945 A | | 8/1995 | Omaru et al. ............... 429/223 |
| 5,472,809 A | | 12/1995 | Perton et al. |
| 5,474,862 A | | 12/1995 | Okuno et al. ............. 429/218.1 |
| 5,518,842 A | * | 5/1996 | Fey et al. .................... 429/331 |
| 5,561,006 A | * | 10/1996 | Lecerf et al. ............... 429/224 |
| 5,639,575 A | | 6/1997 | Omaru et al. ............... 429/197 |
| 5,643,695 A | * | 7/1997 | Barker et al. ............... 429/197 |
| 5,856,043 A | * | 1/1999 | Ohsaki et al. .............. 429/332 |
| 5,891,592 A | * | 4/1999 | Mao et al. ................... 429/331 |
| 5,964,902 A | * | 10/1999 | Mao et al. ................. 29/623.1 |
| 6,040,092 A | * | 3/2000 | Yamada et al. .......... 429/231.8 |
| 6,074,777 A | * | 6/2000 | Reimers et al. ............. 429/200 |

FOREIGN PATENT DOCUMENTS

| | | |
|---|---|---|
| EP | 911 901 | 4/1999 |
| JP | 10-284122 | 10/1998 |

* cited by examiner

*Primary Examiner*—Laura Weiner
(74) *Attorney, Agent, or Firm*—Leydig, Voit & Mayer, Ltd.

(57) ABSTRACT

An organic electrolyte containing an organic solvent mixture and a lithium salt, wherein the organic solvent mixture includes 20 to 60% by volume of ethylene carbonate, 5 to 30% by volume of polypropylene carbonate, and 20 to 70% by volume of chain carbonate. The organic electrolyte improves charge/discharge cycle characteristics while maintaining high discharge capacity and low-temperature discharge characteristics.

6 Claims, 1 Drawing Sheet

ORGANIC ELECTROLYTE AND LITHIUM SECONDARY BATTERY

BACKGROUND OF THE INVENTION

1. Field of the Invention

The present invention relates to an organic electrolyte and a lithium secondary battery, and more particularly, to an organic electrolyte which provides a lithium secondary battery having improved charge/discharge cycle characteristics while exhibiting excellent discharge capacity and low-temperature discharge characteristics, and a lithium secondary battery employing the same.

2. Description of the Related Art

In recent years, electronic equipment has rapidly become smaller and lighter. In particular, in the fields of office automation, lap-top computers, notebook computers or the like have been substituted for desk-top computers. Also, portable electronic equipment such as camcorders, cellular phones or PCS phones have been rapidly in widespread.

With rapid development of smaller and lighter electronic equipment, highly efficient secondary batteries for use as electric sources have been in high demand. In other words, there has been rapid development of lithium secondary batteries which can be a substitute for conventional lead-storage batteries or nickel-cadmium batteries, have a high energy density for fulfilling the requirements of a small and light battery and are capable of being repeatedly charged and discharged.

A lithium secondary battery includes a cathode and an anode using active materials which allow intercalation and deintercalation of lithium ions, and an organic electrolyte or a polymer electrolyte through which lithium ions can be moved is filled between the cathode and the anode, and electrical energy is generated by oxidation and reduction carried out when intercalation/deintercalation of lithium ions occur at the cathode and the anode.

As anode active materials of lithium secondary batteries, metallic lithium capable of reversibly occluding or releasing lithium ions while maintaining structural and electrical properties, lithium alloys or carbon materials having substantially the same chemical potential of lithium intercalation/deintercalation as the metallic lithium, are mainly used.

Lithium secondary batteries using metallic lithium or lithium alloys are referred to as lithium metal batteries, and those using carbon materials are referred to as lithium ion batteries. The lithium metal batteries which are liable to explosion due to short-circuiting caused by growth of dendrites are being replaced with lithium ion batteries using carbon materials free of a danger of explosion as the anode active materials. In the lithium ion batteries, during charging and discharging, only lithium ions are mobile and active materials are retained without being changed. Thus, compared to the lithium metal batteries, the lithium ion batteries exhibit improved cycle life and safety.

As cathode active materials of lithium secondary batteries, complex oxides of transition metals and lithium, which show a voltage 3 to 4.5 V higher than that of Li/Li$^+$ and are capable of intercalation/deintercalation of lithium ions, are mainly used. Examples of the cathode active materials include lithium cobalt oxide (LiCoO$_2$), lithium nickel oxide (LiNiO$_2$), lithium manganese oxide (LiMnO$_2$ or LiMn$_2$O$_4$), lithium nickel cobalt oxide (LiNi$_{1-x}$Co$_x$O$_2$) and the like. Manganese-based materials such as LiMnO$_2$ or LiMn$_2$O$_4$ are attractive materials because they are easily prepared and relatively cheap and cause little environmental pollution. However, the manganese-based materials still have a problem of small capacity. Although lithium cobalt oxides (LiCoO$_2$) exhibiting a high electrical conductivity, a high battery voltage and excellent electrode characteristics are typically used cathode active materials which are commercially available from Sony Corporation of Japan, they are expensive. Among the above-described cathode active materials, lithium nickel oxides (LiNiO$_2$) are relatively cheap and exhibit the highest discharge capacity. However, they are difficult to prepare and are poor in battery safety due to their high discharge capacity.

Since a lithium secondary battery exhibits its battery characteristics by complex reactions between cathode/electrolyte, anode/electrolyte and so on, the use of an appropriate organic electrolyte is one of important factors for improving the performance of the lithium secondary battery. An organic electrolyte is an ion-conductor produced by dissolving a lithium salt in an organic solvent and should be excellent in lithium ion conductivity and chemical and electrochemical stabilities for electrodes. Also, the organic electrolyte should be capable of being used over a broad range of temperature and the manufacturing cost thereof should be low. Thus, it is preferred to use an organic solvent having a low viscosity while having high ion conductivity and a high dielectric constant.

However, there is no single organic solvent which meets these requirements. Thus, the composition of an organic solvent contained in an organic electrolyte is generally a 2-component mixture of a high dielectric constant solvent and a low viscosity solvent (see U.S. Pat. No. 5,437,945 and U.S. Pat. No. 5,639,575), or a 3-component mixture further comprising a third organic solvent having a low freezing point (see U.S. Pat. No. 5,474,862 and U.S. Pat. No. 5,639,575).

The use of such a mixed organic solvent increases mobility of lithium ions, thereby improving ion conductivity and initial discharge capacity of a battery. However, as the cycles proceed, the organic electrolyte undergoes a surface reaction with graphite, which is an anode active material, to degrade discharge capacity, resulting in poor charge/discharge cycle characteristics.

SUMMARY OF THE INVENTION

To solve the above problems, it is an object of the present invention to provide an organic electrolyte which does not readily react with an anode active material, thereby improving charge/discharge cycle characteristics of a lithium secondary battery.

It is another object of the present invention to provide a lithium secondary battery having improved charge/discharge cycle characteristics by using the organic electrolyte.

Accordingly, to achieve the first object, there is provided an organic electrolyte containing a mixed organic solvent and a lithium salt, wherein the mixed organic solvent comprises 20 to 60% by volume of ethylene carbonate, 5 to 30% by volume of propylene carbonate and 20 to 70% by volume of chain carbonate.

In the organic electrolyte, the content of a mixture of ethylene carbonate and propylene carbonate is preferably 25 to 65% by volume.

Also, the chain carbonate is preferably at least one compound selected from the group consisting of dimethyl carbonate, diethyl carbonate, dipropyl carbonate, methylethyl carbonate and methylpropyl carbonate.

Further, the lithium salt is preferably at least one compound selected from the group consisting of $LiPF_6$, $LiBF_4$, $LiAsF_6$, $LiClO_4$, $CF_3SO_3Li$, $LiC(CF_3SO_2)_3$, $LiN(C_2F_5SO_2)_2$ and $LiN(CF_3SO_2)_2$.

According to another aspect of the present invention, there is provided a lithium secondary battery including a cathode having lithium containing metal oxide, an anode having metallic lithium, a lithium alloy or a carbon material, and the organic electrolyte according to the first aspect of the present invention.

BRIEF DESCRIPTION OF THE DRAWINGS

The above objects and advantages of the present invention will become more apparent by describing in detail a preferred embodiment thereof with reference to the attached drawings in which.

DESCRIPTION OF THE PREFERRED EMBODIMENTS

Figure 1:
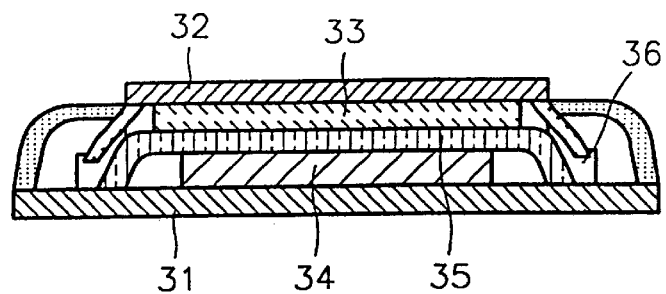
FIG. 1 is a cross-sectional view illustrating a coin-type battery using an organic electrolyte according to a preferred embodiment of the present invention.

An organic electrolyte according to the present invention is obtained by mixing a solvent mixture as a main solvent and an appropriate amount of a low-viscosity chain carbonate, i.e., an organic carbonate compound. Here, the solvent mixture is predominantly composed of ethylene carbonate which is a high dielectric solvent and a trace of propylene carbonate. The chain carbonate is added for preventing degradation of discharge characteristics due to a high viscosity occurs when the solvent mixture is used alone.

The content of ethylene carbonate is preferably 20 to 60% by volume. If the content of ethylene carbonate is less than 20% by volume, high-rate discharge characteristics of batteries are degraded. If the content of ethylene carbonate is greater than 60% by volume, the impregnation rate of the electrolyte into a separator becomes poor. The content of propylene carbonate is preferably 5 to 30% by volume. If the content of propylene carbonate is less than 5% by volume, low-temperature characteristics are degraded. If the content of propylene carbonate is greater than 30% by volume, irreversible properties increase and the cycle life characteristics are deteriorated.

The content of chain carbonate is preferably 20 to 70% by volume. If the content of chain carbonate is less than 20% by volume, high-rate discharge and cycle life characteristics of batteries are degraded. If the content of chain carbonate is greater than 70% by volume, the cycle life characteristics and capacity are lowered.

It has been found that the organic electrolyte according to the present invention has excellent charge/discharge cycle characteristics while maintaining a high discharge capacity of a lithium secondary battery. Therefore, a lithium secondary battery employing the organic electrolyte according to the present invention experiences little reduction in discharge capacity even after repeated cycles. This is presumably because the organic electrolyte easily generates a solid electrolyte interface (SEI) on the surface of an anode.

The present invention will be explained in more detail with reference to Examples and Comparative Examples. However, it is to be understood that the present invention is not limited to these examples.

$LiPF_6$ made by Hashimoto Corporation of Japan was used in the following Examples and Comparative Examples without purification. As a solvent used for preparing an organic electrolyte, a battery material made by Merck Corporation of Japan was used. All experiments were carried out under an argon gas (99.9999% or higher) atmosphere.

EXAMPLE 1

A sample bath containing solid ethylene carbonate was put into an electric mantle and then heated slowly to 70 to 80° C. to be liquified. Then, as much $LiPF_6$ as can produce a 1M $LiPF_6$ solution was put into a plastic bath for storage of an electrolyte, dimethyl carbonate and propylene carbonate were added thereto and then stirred violently to dissolve the $LiPF_6$ salt.

Here, a desired organic electrolyte was produced by adjusting the mixture ratio of ethylene carbonate, dimethyl carbonate, and propylene carbonate to be 42.5:42.5:15 by volume.

EXAMPLE 2

An organic electrolyte was produced in the same manner as in Example 1, except for adjusting the mixture ratio of ethylene carbonate, dimethyl carbonate, and propylene carbonate to be 40:40:20 by volume.

EXAMPLE 3

An organic electrolyte was produced in the same manner as in Example 1, except for adjusting the mixture ratio of ethylene carbonate, ethylmethyl carbonate, and propylene carbonate to be 42.5:42.5:15 by volume.

EXAMPLE 4

An organic electrolyte was produced in the same manner as in Example 1, except for adjusting the mixture ratio of ethylene carbonate, ethylmethyl carbonate, and propylene carbonate to be 40:40:20 by volume.

EXAMPLE 5

An organic electrolyte was produced in the same manner as in Example 1, except for adjusting the mixture ratio of ethylene carbonate, methylpropyl carbonate, and propylene carbonate to be 42.5:42.5:15 by volume.

COMPARATIVE EXAMPLE 1

An organic electrolyte was produced in the same manner as in Example 1, except for adjusting the mixture ratio of propylene carbonate, dimethyl carbonate, and diethyl carbonate to be 45:45:10 by volume.

COMPARATIVE EXAMPLE 2

An organic electrolyte was produced in the same manner as in Example 1, except for adjusting the mixture ratio of ethylene carbonate, methylpropyl carbonate, and n-propyl acetate to be 30:30:40 by volume.

COMPARATIVE EXAMPLE 3

An organic electrolyte was produced in the same manner as in Example 1, except for adjusting the mixture ratio of ethylene carbonate, ethylmethyl carbonate, and gamma-butyrolactone to be 45:45:10 by volume.

The discharge capacity, charge/discharge cycle characteristics and low-temperature discharge capacity of organic electrolytes produced in Examples 1 through 5 and Comparative Examples 1 through 3 were measured. The above characteristics were measured as follows.

1) Discharge capacity and charge/discharge cycle characteristics

In order to evaluate the charge/discharge cycle characteristics of batteries employing the organic electrolytes produced in Examples 1 through 5 and Comparative Examples 1 through 3, a 2106 type coin battery (see FIG. 1) was fabricated as follows. Referring to FIG. 1, the coin battery is constructed such that an anode 33, a cathode 34, and a separator 35 are disposed inside a stainless case 31 and a top 32. Reference numeral 36 denotes an insulating gasket. A paste-type cathode active material was produced by mixing $LiCoO_2$, $LiNi_{1-x}Co_xM_yO_2$ ($0<x<1$ and $0\leq y \leq 1$), Super-P carbon made by M.M.M. Carbon Co. and polytetrafluoroethylene dissolved in N-methylpyrrolidone, was cast on a 200 μm thick aluminum foil, and was then dried, pressed and cut, thereby fabricating the cathode 34 for the coin battery.

Also, a paste-type anode active material was produced by mixing graphite powder commercially available in the name of MCMB 2528 made by Osaka Gas Co., Super-P carbon, and polytetrafluoroethylene dissolved in N-methylpyrrolidone, was cast on a 200 μm thick aluminum foil, and was then dried, pressed and cut, thereby fabricating the anode 33 for the coin battery.

As the separator 35, Cellgard 2400 made by Hoechst Celanese Co. was used. The separator 35 was disposed between the anode 33 and the cathode 34 and then immersed in organic electrolytes produced in Examples 1 through 5 and Comparative Examples 1 through 3 for 10 minutes and then taken out. After 10 minutes, the immersed structure was taken out and then hermetically sealed in the stainless case 31, the stainless top 32 and the insulation gasket 36 using a clamping machine, thereby producing the 2016 type coin battery shown in FIG. 1.

The thus-produced coin battery was subjected to 50 charge/discharge cycles and the discharge capacities thereof were measured and then compared with initial discharge capacity. The discharge capacity and charge/discharge cycle characteristics were tested using a commercial battery tester made by Maccor Inc. The charge and discharge cycle tests were carried out at 25° C. with 1C and charging voltages were in the range of 2.75 to 4.2 V. The discharge capacity and charge/discharge cycle characteristics of the organic electrolytes produced in Examples 1 through 1 and Comparative Examples 1 through 3 in the above-described manner are shown in Table 1.

2) Low-temperature characteristics

Batteries produced using the organic electrolytes produced in Examples 1 through 5 and Comparative Examples 1 through 3 were charged under constant current and constant voltage conditions, that is, a constant current of 0.1C and a constant voltage of 4.2 V. The charged batteries were left intact at −20° C. for 17 hours and then discharged at a rate of 0.5 H until the battery voltage reached 2.75 V. The results of the tests, based on comparison with the discharge capacity at 25° C., are shown in Table 1.

TABLE 1

|  | Composition of organic electrolyte (% by volume) | Discharge capacity (mAh/g) | | Charge/discharge cycle characteristic (%) | | Low-temperature discharge characteristic (−20° C., %) |
|---|---|---|---|---|---|---|
|  |  | Cathode | Anode | Cathode | Anode |  |
| Example 1 | EC/DMC/PC[1]) = 42.5/42.5/15 | 203 | 319 | 90 | 90 | 63 |
| Example 2 | EC/DMC/PC = 40/40/20 | 202 | 315 | 87 | 91 | 68 |
| Example 3 | EC/EMC/PC = 42.5/42.5/15 | 201 | 325 | 92 | 89 | 65 |
| Example 4 | EC/EMC/PC = 40/40/20 | 201 | 317 | 85 | 88 | 74 |
| Example 5 | EC/MPC/PC = 42.5/42.5/15 | 198 | 325 | 90 | 91 | 70 |
| Comparative Example 1 | PC/DMC/DEC = 45/45/10 | 205 | 324 | 93 | 65 | 70 |
| Comparative Example 2 | EC/MPC/PA = 30/30/40 | 199 | 328 | 87 | 36 | 85 |
| Comparative Example 3 | EC/EMC/GBL = 45/45/10 | 200 | 282 | 54 | 15 | 45 |

1) EC: ethylene carbonate; DMC: dimethyl carbonate; PC: propylene carbonate; EMC: ethylmethyl carbonate; MPC: methylpropyl carbonate; DEC: diethyl carbonate; PA: n-propyl acetate; and GBL: γ-butyrolactone Referring to Table 1, as seen from comparison between lithium secondary batteries employing the organic electrolytes produced in Examples 1 through 5 and those employing the organic electrolytes produced in Comparative Examples 1 through 3, little difference was exhibited in view of discharge capacity and low temperature discharge characteristics of cathode and anode batteries. However, it was found that the batteries employing the organic electrolytes produced in Examples 1 through 5 had superior 50-cycle charge/discharge cycle characteristics, particularly, of anode batteries, compared to those employing the organic electrolytes produced in Comparative Examples 1 through 3. In Comparative Example 3, the discharge capacity of an anode battery was 282 mAh/g, which is about 40 mAh/g lower than the other Examples and Comparative Examples, and the charge/discharge cycle characteristic was also poor. However, in Examples 3 and 4 in which PC in the organic electrolyte composition was used instead of GBL used in Comparative Example 3, a sharp rise in the charge/discharge cycle characteristic was observed, compared to Comparative Example 3. Also, in Example 5 in which PC in the organic electrolyte composition was used instead of PA used in Comparative Example 2, a sharp rise in the charge/discharge cycle characteristic was observed, compared to Comparative Example 2.

Table 1 shows that the charge/discharge cycle characteristics of Examples 1 through 5 were achieved without lowering the discharge capacity.

In the lithium secondary batteries employing the organic electrolytes in Examples 1 through 5, improvement in the charge/discharge cycle characteristics thereof without lowering the discharge capacity, is presumably facilitated by formation of SEI by the organic electrolytes, which allows repetitive mobility of lithium ions to be reversible, thereby improving electrochemical interface characteristics with graphite as an anode active material.

Figure 2:
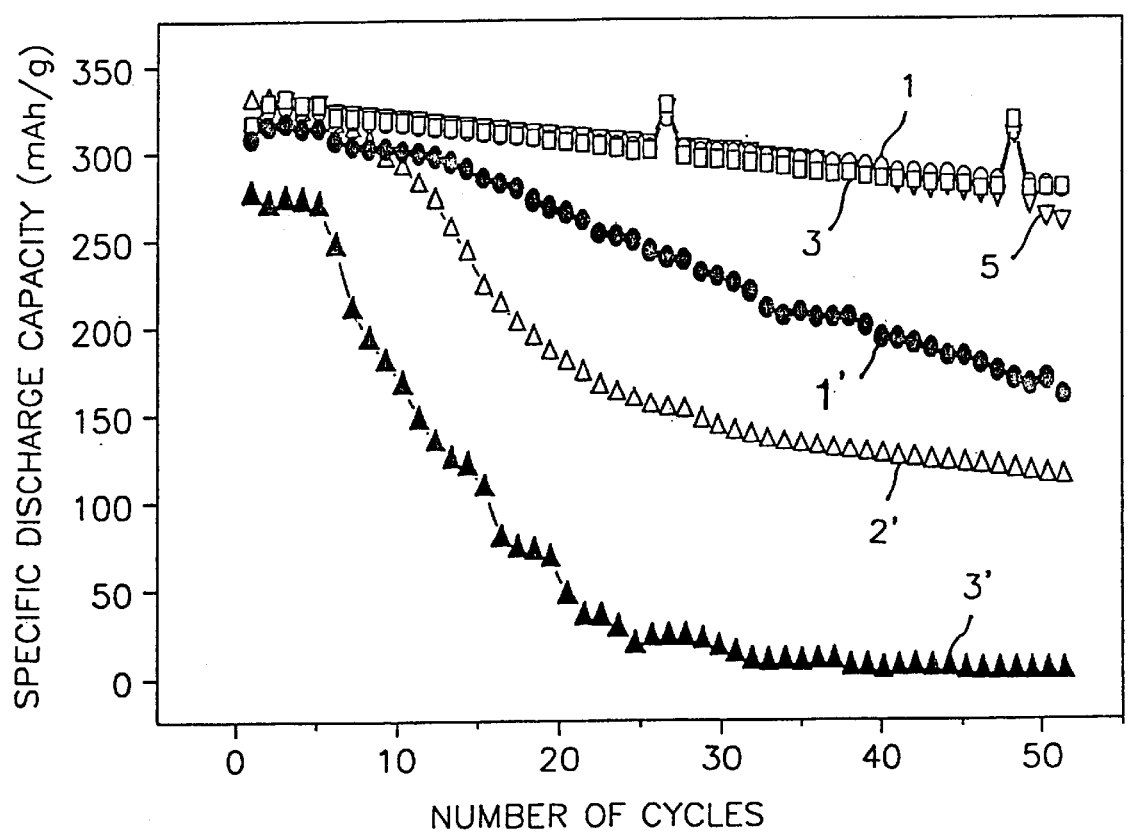
FIG. 2 is a graph illustrating test results of charge/discharge cycle characteristics of a lithium secondary battery using organic solvents based on Examples 1, 3 and 5 and Comparative Examples 1 through 3.

FIG. 2 is a graph illustrating test results of charge/discharge cycle characteristics of lithium secondary batteries employing the organic electrolytes produced in Examples 1, 3 and 5 and Comparative Examples 1 through 3. In FIG. 2, plots indicated by numbers 1, 3 and 5 are for cases of using organic electrolytes of Examples 1, 3 and 5, and plots indicated by numbers 1', 2' and 3' are for cases of using organic electrolytes of Comparative Examples 1 through 3.

Referring to FIG. 2, except Comparative Example 3, a great difference in the charge/discharge cycle characteristic was not exhibited up to about 10 cycles. However, in cycles after 10 cycles, the discharge capacities of Comparative Examples 1 through 3 are rapidly lowered, which implies very poor discharge capacities compared to those of Examples 1 through 5.

Conversely, the lithium secondary batteries employing organic electrolytes of Examples 1, 3 and 5 of the present invention maintain 88 to 91% of the initial discharge capacity even after 50 cycles, that is, the discharge capacity is lowered little according to the proceeding of cycles.

As described above, an organic electrolyte for use in a lithium secondary battery according to the present invention obtained by mixing a solvent mixture as a main solvent and an appropriate amount of low-viscosity chain carbonate improves charge/discharge cycle characteristics while maintaining high discharge capacity and low-temperature discharge characteristics. Here, the solvent mixture is predominantly composed of ethylene carbonate, which is a high dielectric solvent, and a trace of propylene carbonate. The chain carbonate is added for preventing degradation of discharge characteristics due to a high viscosity occurring when the mixed solvent is used alone. Therefore, the lithium secondary battery employing the organic electrolyte according to the present invention exhibits little reduction in the discharge capacity even after long cycles. That is, a lithium secondary battery employing the organic electrolyte according to the present invention has excellent battery capacity and low-temperature discharge characteristics and exhibits stable charge/discharge cycle characteristics even with the proceeding of cycles.

What is claimed is:

1. An organic electrolyte containing an organic solvent mixture and a lithium salt, wherein the organic solvent mixture comprises 20 to 60% by volume of ethylene carbonate, 5 to 30% by volume of propylene carbonate, and 20 to 70% by volume of methylpropyl carbonate.

2. The organic electrolyte according to claim 1, wherein the content of the mixture of ethylene carbonate and propylene carbonate is 25 to 65% by volume.

3. The organic electrolyte according to claim 2, wherein the lithium salt is at least one compound selected from the group consisting of $LiPF_6$, $LiBF_4$, $LiAsF_6$, $LiClO_4$, $CF_3SO_3Li$, $LiC(CF_3SO_2)_3$, $LiN(C_2F_5SO_2)_2$, and $LiN(CF_3SO_2)_2$.

4. The organic electrolyte according to claim 1, wherein the lithium salt is at least one compound selected from the group consisting of $LiPF_6$, $LiBF_4$, $LiAsF_6$, $LiClO_4$, $CF_3SO_3Li$, $LiC(CF_3SO_2)_3$, $LiN(C_2F_5SO_2)_2$, and $LiN(CF_3SO_2)_2$.

5. A lithium secondary battery comprising:
a cathode including a lithium-containing metal oxide;
an anode including one of metallic lithium, a lithium alloy, and a carbon material; and
an organic electrolyte containing an organic solvent mixture and a lithium salt, wherein the organic solvent mixture comprises 20 to 60% by volume of ethylene carbonate, 5 to 30% by volume of propylene carbonate, and 20 to 70% by volume of methylpropyl carbonate.

6. The lithium secondary battery according to claim 5 wherein the content of the mixture of ethylene carbonate and propylene carbonate is 25 to 65% by volume.

* * * * *